March 19, 1935.  W. W. POTTER  1,994,867
LIQUID FILTER AND MIXER
Filed May 2, 1932
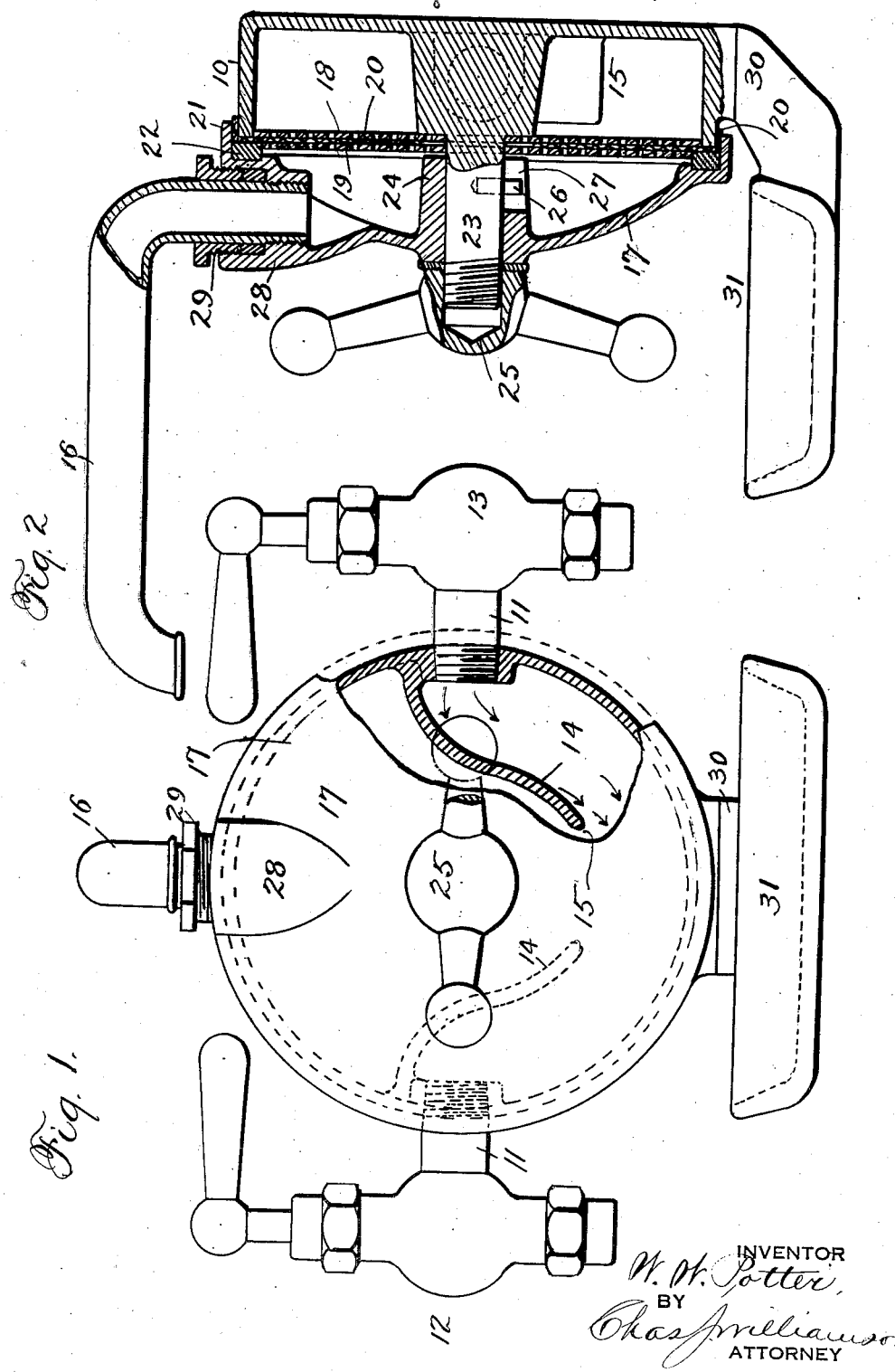

Patented Mar. 19, 1935

1,994,867

UNITED STATES PATENT OFFICE 1,994,867

LIQUID FILTER AND MIXER

William Wallace Potter, Pawtucket, R. I.

Application May 2, 1932, Serial No. 608,776

1 Claim. (Cl. 210—77)

It is very desirable especially in wash basins or stands for personal ablutions where provision is made for hot and cold water, to assure the completest, possible mixing of the waters of two temperatures by the time of delivery at the outlet to the basin and such result assured as quickly as possible.

An object of my invention is to provide such a device. Again, it is important that such a device may be made so compact as to enable its use in conformity with the standard hot and cold water tap connections and that in appearance, it will not only not be unattractive but may, indeed, be ornamental. Another object of my invention is to achieve that. It is also desirable to assure that water for such use shall be in a pure, clear condition at the time of delivery to the basin. It is a feature of a mixer embodying my invention that it may have as a constituent part thereof a filter which will not only efficiently serve the purpose but which will readily permit access for removal of sediment and renewal of the filtering agent or medium.

Other objects and advantages of my invention will be understood from the embodiment thereof shown in the drawing.

My invention consists in whatever is described by or is included within the terms or scope of the appended claim.

In the drawing:

Fig. 1 is a view in front elevation of a very satisfactory embodiment of my invention;

Fig. 2 is a vertical section with parts in elevation.

Describing what is shown in the drawing, I employ a circular, hollow body or shell, 10, with a flat back wall and an annular rim which at diametrically opposite sides has ports into which are screwed the ends of nipples 11, of cold and hot water spigots or taps 12 and 13, so that the inflow of water from the spigots into the chamber within the shell 10, is at diametrically opposite points. Reaching from a point immediately above each port and extending in a compound curve downward and inward is a baffle or deflector 14, such baffles terminating a distance apart at their lower ends to provide a space 15, a substantial distance above the concavely curved bottom of the chamber within the shell 10, so that water flowing simultaneously from both spigots will be directed in two streams downward and towards one another under head and gravity so that they will meet with considerable force below the space 15, and enter one into the other and by swirling be thoroughly mixed and thus commingled or mixed and at a temperature controlled or proportioned by the ratio of influx from the two spigots, will pass from between the baffles and to a nozzle or outlet 16, provided preferably at the top of the device. The inner end of the nozzle 16, opens into a chamber provided by a concavo convex front wall or cap 17, which closes the front, otherwise open side of the shell 10, and which being detachable is utilized to secure the filter at the front, open side of the shell 10, the filter thus being interposed between the water mixing chamber and the outlet chamber with which the nozzle 16, is connected and thus assures filtration of the water before it enters the nozzle. The filter shown comprises two flat, perforated metal discs 18 and 19 and a sheet of filter cloth or paper 20, between them. The diameter of the filter sheet is sufficiently greater than the external diameter of the shell 10, as to lap over the outside of the latter within a circumferential flange or rim 21, on the cap or cover 17, a packing ring or gasket 22, being provided within the cap, to make a water-tight joint between the parts. The cover is removably clamped in place for which purpose there is provided at the center of the shell 10, an outwardly projecting shank or stem 23, which passes through holes in the filter members and through an alining hole in a central hub 24, on the inside of the cap 17, the outer end of the stem 23, being threaded for engagement by a clamp nut 25. The cover or cap 17, is slidable on and off the stem 23, and when it is removed the filter members may be removed and access given to the interior of the shell 10, for cleaning out sediment. Any water in the shell 10, will, of course, flow or pass out on the removal of the cover therefrom. Turning of the cover on the stem 13, is prevented by a radial pin 26, that projects from the stem into a slot 27, in the cover hub. Turning would be objectionable because it would result in displacing the position of the nozzle 16, which is carried by the cover.

Preferably the nozzle 16, may be swung horizontally, and it, therefore, has a loose screw fitting at its inner end with a hole in a boss 28, on the cover, an air-tight joint being provided by a gland or packing 29.

To the bottom of the shell 10, is attached by a forwardly extending arm or bracket 30, a soap dish or tray 31, or a holder for some other article or articles for toilet uses.

Besides being a very practical thing, it is evident from the embodiment of my invention shown in the drawing, it may be given a design or configuration which will make it an attractive or ornamental fixture. It will also be evident from the embodiment shown that parts may be made of pressed metal.

What I claim is:

A liquid mixer comprising a body having a chamber with spaced apart inlets for liquids to be mixed, an outlet for mixed liquids and a flat, removable filter within the chamber interposed between the liquid inlets and outlet, the chamber having a removable cover, and means for exerting clamping pressure from the cover separable from the filter on a portion of the filter comprising a central stem projecting horizontally from the body that passes through alining holes in filter and cover and a nut acting on the outer side of the cover.

WILLIAM WALLACE POTTER.